United States Patent

[11] 3,611,107

[72] Inventor James R. Ruckel
King of Prussia, Pa.
[21] Appl. No. 864,381
[22] Filed Oct. 7, 1969
[45] Patented Oct. 5, 1971
[73] Assignee I-T-E Imperial Corporation
Philadelphia, Pa.

[54] CONVERTER BUS STRUCTURE AND STUD-MOUNTED DIODES AND FUSES THEREFOR WITH IDENTICAL BUSES HAVING THREADED OPENINGS
4 Claims, 6 Drawing Figs.

[52] U.S. Cl. .......... 321/8,
317/234 A, 317/234 B, 317/234 C, 317/234 R,
321/11, 165/105
[51] Int. Cl. .......... H02m 5/42
[50] Field of Search .......... 317/234,
235, 1, 1.5, 4, 4.1, 11, 3; 321/8, 11; 165/105

[56] References Cited

UNITED STATES PATENTS

| | | | |
|---|---|---|---|
| 2,886,747 | 5/1959 | Diebold | 317/234 |
| 2,979,644 | 4/1961 | Saizer | 317/234 |
| 3,005,945 | 10/1961 | Saizer | 317/234 |
| 3,275,921 | 9/1966 | Fellendorf et al. | 317/234 |
| 3,320,498 | 5/1967 | Evans | 317/234 |
| 3,370,216 | 2/1968 | Bowar et al. | 317/234 |

FOREIGN PATENTS

| | | | |
|---|---|---|---|
| 1,071,233 | 12/1959 | Germany | 317/234 |

*Primary Examiner*—John W. Huckert
*Assistant Examiner*—Andrew J. James
*Attorney*—Ostrolenk, Faber, Gerb & Soffen

ABSTRACT: Adjacent, elongated buses of a rectifier are connected to one another by parallel circuits, each including a series-connected fuse and diode. Each of the buses is provided with spaced, tapped openings and each of the diodes and fuses are connected to their respective bus by a threaded connector extending from the diode and fuse. The fuse and diode of each parallel-connected group is threaded directly into a respective one of the two bus bars so that each fuse and diode is connected to a heavy heat sink.

BEST AVAILABLE COPY

INVENTOR.
JAMES R. RUCKEL

BY

Ostrolenk, Faber, Gerb & Soffen

ATTORNEYS

INVENTOR.
JAMES R. RUCKEL

BY

Ostrolenk, Faber, Gerb & Soffen
ATTORNEYS

CONVERTER BUS STRUCTURE AND STUD-MOUNTED DIODES AND FUSES THEREFOR WITH IDENTICAL BUSES HAVING THREADED OPENINGS

BRIEF SUMMARY OF INVENTION

This invention relates to high-power conversion equipment, and more particularly relates to a novel construction for the conductive bus and interconnected fuses and diodes of a rectifier or inverter-type circuit. In accordance with one feature of the present invention, each of a plurality of parallel-connected diodes are connected between two bus bars wherein each diode is further connected in series with a respective fuse. In order to ensure a good heat sink for both the fuses and the diodes, they are each provided with threaded studs which can be threaded into tapped openings in each bus.

Such threaded studs for diodes are well known, and diodes commonly are threaded into a bus bar. Fuses, however, are commonly provided with other types of terminals such as switchblade terminals or bolt terminals, or the like.

In accordance with an important feature of the invention, the fuses are provided with threaded stud terminals which have a thread identical to the thread of the diodes with which they are associated so that the fuses, as well as the diodes, can be connected to a respective bus bar by a threaded connection. This provides improved cooling for the fuses and further considerably simplifies the manufacture of the bus equipment since identical drilling and tapping operations can be used for all of the bus work. Where the fuses to be used are those having blown fuse indicator pins, the pins can be located to come out through the center of the connector stud or through the end or middle of the fuse barrel. Generally, such pins are located so that they do not interfere with strap connectors connecting the fuses to their respective diodes.

DETAILED DESCRIPTION OF DRAWINGS

Figure 1:
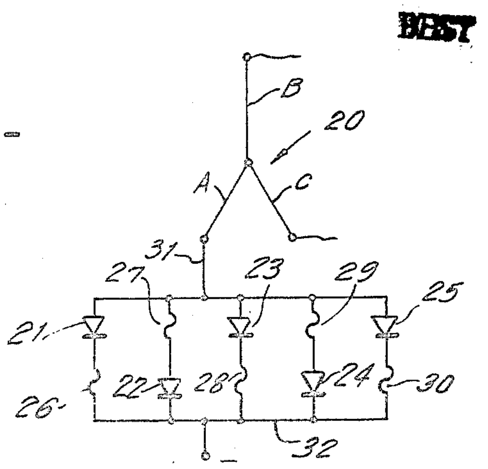
FIG. 1 schematically shows a portion of a rectifier circuit using parallel-connected diodes.

Referring first to FIG. 1, there is schematically illustrated therein a wye-connected secondary winding 20 of a power transformer where the wye-connected winding has three phases A, B and C. Phase A is shown as connected to a plurality of parallel-connected diodes 21 to 25, which are connected in series with respective fuses 26 to 30, respectively. In FIG. 1, the anodes of each of diodes 21 and 23 are connected to AC bus 31.

Figure 3:
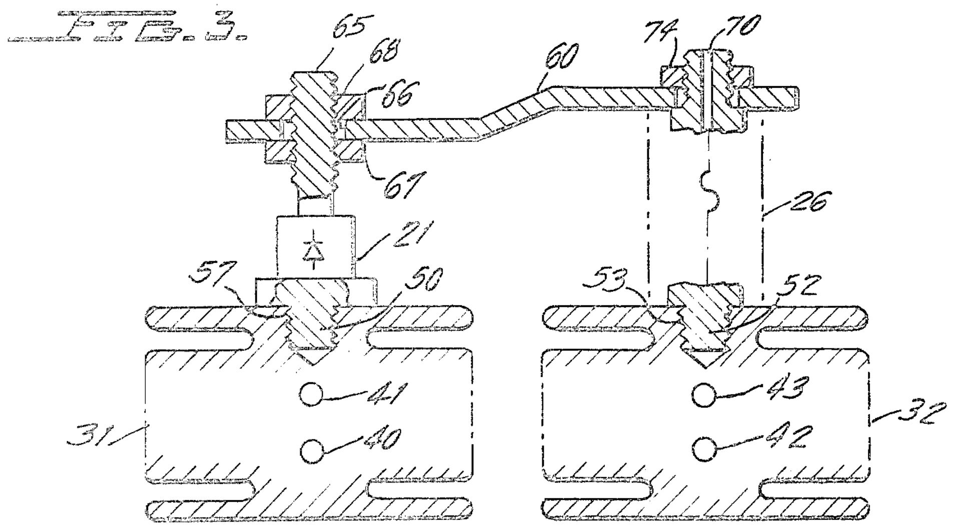
FIG. 3 is a cross-sectional view through the bus of FIG. 2 to illustrate the threaded connection between the diode and its respective bus and the fuse and its respective us.
Figure 2:
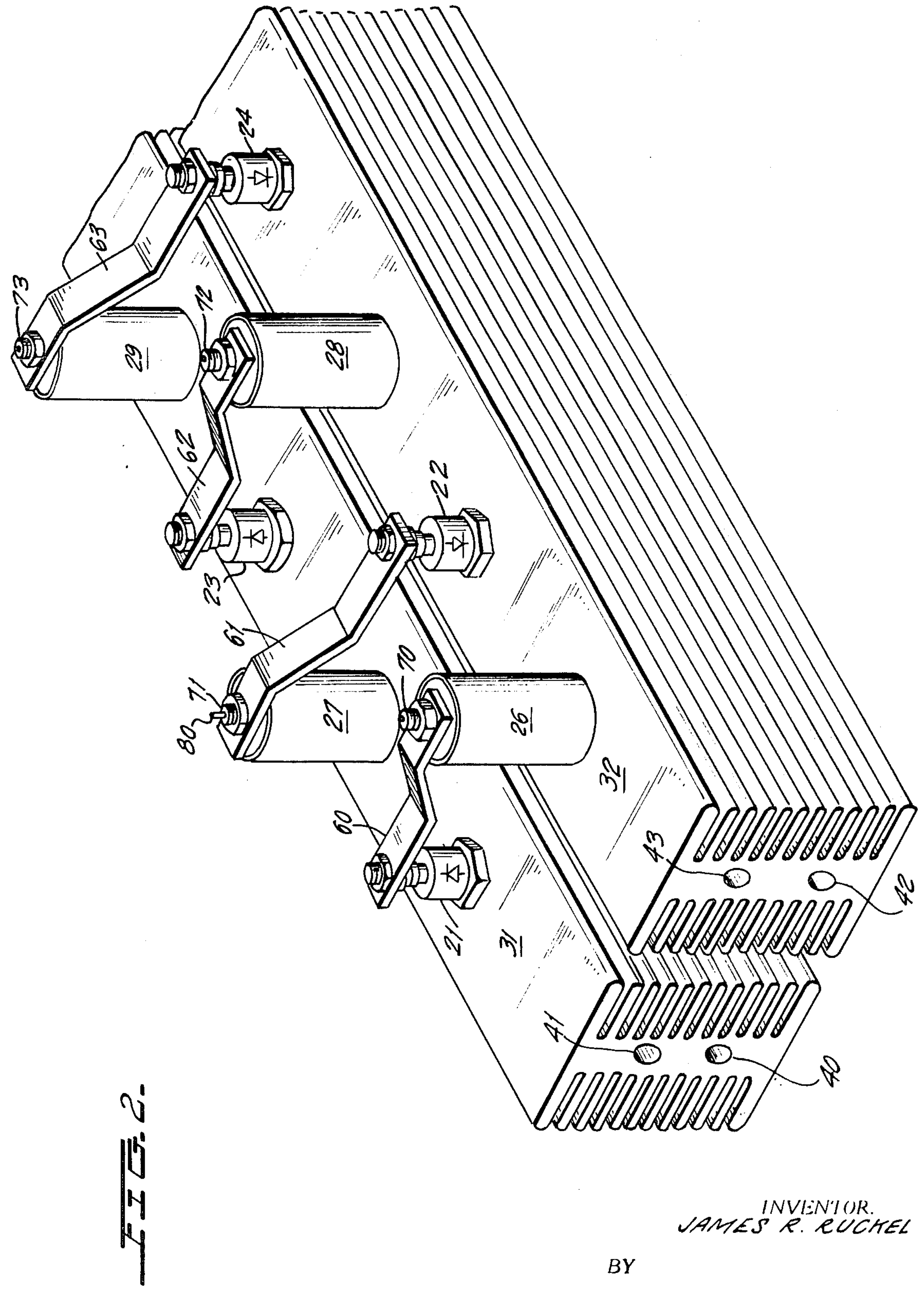
FIG. 2 is a perspective view of an AC–DC bus of the circuit of FIG. 1 having diodes and fuses mounted therein in accordance with the invention.

As shown in FIGS. 2 and 3, diodes 21 and 23 are built as reverse diodes; that is, they are built so that their threaded studs constitute the anodes of the devices. Diodes 22 and 24, however, are constructed in the normal fashion in which their threaded studs are the cathodes of the device so that diodes 22 and 24 are threaded directly into the DC bus, shown in FIGS. 1, 2 and 3 as DC bus 32.

Each of fuses 26, 27, 28 and 29 are then threaded into one of buses 31 or 32. Thus, as seen in FIGS. 2 and 3, fuses 26 and 28 are threaded into DC bus 32, while fuses 27 and 29 are threaded into AC bus 31. Buses 31 and 32 may consist of identical buses having a suitable fin configuration to promote air cooling of the bus. They may also have channels, such as channels 40, 41, 42 and 43, for conducting a cooling fluid.

Figure 4:
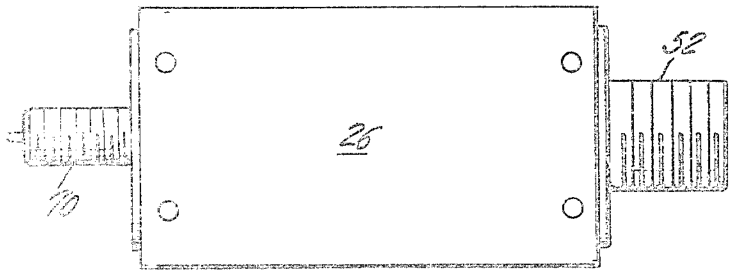
FIG. 4 is a plan view of the fuse which can be used in FIGS. 2 and 3.

The upper surface of the bus is then tapped along its length with tapped openings, identical to one another, which can threadably receive the threaded stud of any of the fuses and diodes to be connected to the bus. For example, in FIG. 3, diode 21 has a threaded stud 50 which is threaded into the typically tapped opening 57 of bus 31. The fuses, such as fuse 26, are then constructed in the manner shown in FIG. 4 so that the fuses are terminated with conductive threaded studs, such as threaded stud 52 of fuse 26. In all other respects, the fuses may have a conventional construction. The threaded stud 52 of fuse 26 of FIG. 3 is shown in FIG. 3 as threaded into tapped opening 53 of bus 32. Note that tapped opening 53 is identical to tapped opening 57 for bus 31.

The fuses and diodes are then connected in series with one another by conductive straps shown in FIG. 2 as conductive straps 60, 61, 62 and 63 where these conductive straps are connected to the respective fuse and diode combination by a suitable nut and bolt arrangement. By way of example, in FIG. 3, the cathode terminal 65 of diode 21 is threaded and extends through an opening 66 in strap 60. Clamping nuts 67 and 68 secure the left-hand end of strap 60 to the threaded member 65. The fuse has upper threaded studs, such as upper threaded studs 70, 71, 72 and 73 where FIG. 3 shows stud 70 of fuse 26 extending through an opening in the right-hand end of conductive strap 60. Stud 70 receives a locknut 74 to form a secure electrical connection between the fuse and strap 60.

If the fuses 26, 27, 28 and 29 are of the type which carry indicator pins which are ejected upon operation of the fuse, such pins are preferably ejected through an opening in the upper studs 70 to 73. For example, a pin 80 is shown as having been ejected from fuse 27. By having the pin ejected from this region of the fuse, the pin cannot be interfered with or obscured by the strap connecting the fuse to its respective diodes as would be the case if the pin were ejected from the end of the fuse barrel. Note, however, that the blown fuse indicator pin could have many other possible locations on the fuse.

It is to be noted that while the connecting straps 60 to 63 have been indicated as being rigid conductive straps, these straps can, if desired, be flexible. Moreover, it will be apparent that any number of parallel-connected diodes could have been used. Furthermore, it would be possible, in accordance with the scope of the present invention, to have all diodes of a common junction type so that all of the diodes are disposed on one of buses 31 and 32, while all of the fuses are disposed on the other of the buses.

There is a further advantage obtained in the overall system of the invention if the fuses used are selected to be those having their fusable link adjacent one end of the fuse rather than being centrally located within the fuse. Such fuses are shown in U.S. Pat. No. 3,413,585 in the name of F. J. Kozacka. By placing the link adjacent the major heat sink formed by the AC or DC bus, it becomes possible to effectively remove heat from the fuse link to prevent possible thermal fatigue which would unintentionally open the fuse.

Figure 6:
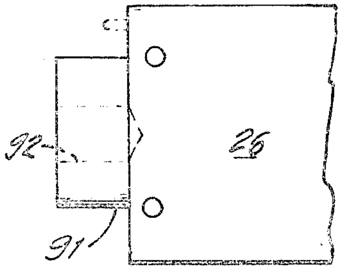
FIG. 6 shows a further modification of the fuse of FIG. 4.
Figure 5:
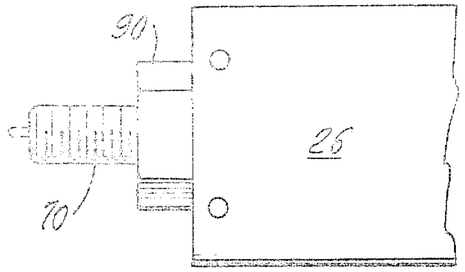
FIG. 5 shows a modification of the fuse of FIG. 4.

FIGS. 5 and 6 illustrate a few of the modifications which can be made to the various fuses in accordance with the invention. For example, in FIG. 5, fuse 26 is shown modified to have a hexagonal head portion 90 which assists in threading the fuse into its respective bus.

FIG. 6 shows a modification of fuse 26 wherein, instead of an extending stud, there is provided an internally threaded conductive adapter 91 having an internal thread 92. Thus, the fuse end of the conductive strap to be connected to the fuse can be connected thereto by a bolt which is passed through the conductive strap and is threaded into tapped opening 92 of adapter 91.

Although this invention has been described with respect to particular embodiments, it should be understood that many variations and modifications will now be obvious to those skilled in the art, and, therefore, the scope of this invention is limited not by the specific disclosure herein, but only by the appended claims.

The embodiments of the invention in which exclusive privilege or property is claimed are defined as follows:

1. An electrical conversion system for converting from AC to DC power; a first elongated electrical bus conductor connectable to an AC terminal; a second elongated us conductor connectable to a DC terminal; said first and second elongated bus conductors being disposed parallel to one another and spaced from one another; a plurality of semiconductor devices; each of said semiconductor devices having a threaded stud forming a first terminal thereof and having a second terminal; a plurality; of fuses each of said fuses having a threaded stud forming a first terminal thereof and having a second terminal, each of said first and second bus conductors being identical in construction and having a plurality of identical, spaced, threaded openings extending along their lengths; said threaded stud of each of said semiconductor devices being threaded into one of said threaded openings in one of said first and second bus conductors; said threaded stud of each of said fuses being threaded into one of said threaded openings in the other of said first and second bus conductors and adjacent its said respective semiconductor device; and an electrical conductors connected between said second terminals of each of said respective fuses and semiconductor devices to connect each fuse in series with an associated semiconductor device; said first and second bus conductors each being rectangular in cross section; said threaded openings being formed in one surface of each of said rectangular first and second bus conductors; said surfaces of said bus conductors being coplanar with one another; at least a portion of said electrical conductor extending generally parallel to the plane of said coplanar surfaces.

2. The system of claim 1 wherein each of said fuses have a fuse link therein adjacent to their said threaded stud.

3. The system of claim 1 wherein each of said threaded openings in both said first and second bus conductors receive, alternately, one of said semiconductor devices, and one of said fuses.

4. The system of claim 1 wherein said semiconductor device is a diode.